United States Patent [19]

Bohle

[11] Patent Number: 5,090,815
[45] Date of Patent: Feb. 25, 1992

[54] APPARATUS FOR MIXING CHARGES OF FLOWABLE MATERIAL

[75] Inventor: Lorenz B. Bohle, Ennigerloh, Fed. Rep. of Germany

[73] Assignee: L. B. Bohle Pharmatechnik GmbH, Ennigerloh, Fed. Rep. of Germany

[21] Appl. No.: 637,877

[22] Filed: Jan. 4, 1991

[30] Foreign Application Priority Data

Jan. 4, 1990 [DE] Fed. Rep. of Germany ....... 4000110
Jan. 30, 1990 [DE] Fed. Rep. of Germany ... 9001012[4]
Feb. 20, 1990 [DE] Fed. Rep. of Germany ....... 4005219

[51] Int. Cl.$^5$ .............................. G01F 7/16
[52] U.S. Cl. .................... 366/192; 366/196; 366/245; 366/299; 366/325; 222/504; 222/556
[58] Field of Search ........ 366/198, 203, 207, 192–196, 366/240–242, 244, 245, 247, 249–251, 261, 279, 285, 286, 289, 299, 325, 330, 605; 222/504, 556

[56] References Cited

U.S. PATENT DOCUMENTS

| | | | |
|---|---|---|---|
| 500,090 | 7/1893 | Bunker | 366/203 |
| 547,263 | 10/1895 | Hoyle | 366/193 |
| 689,170 | 12/1901 | Dragoo et al. | 366/203 |
| 748,104 | 12/1903 | Rosback | 366/192 |
| 1,090,148 | 3/1914 | Harr | 366/207 |
| 1,151,295 | 8/1915 | Schlueter | 366/261 |
| 1,349,159 | 8/1920 | Knoedler | 366/195 |
| 1,695,345 | 12/1928 | Read | 366/207 |
| 1,778,049 | 10/1930 | Thornton et al. | 366/247 |
| 1,943,194 | 1/1934 | Vachoux | 366/286 |
| 2,207,884 | 7/1940 | Holmen | 366/195 |
| 2,295,098 | 9/1942 | Cornell | 366/245 |
| 2,387,024 | 10/1945 | Hishon et al. | 366/251 |
| 2,569,352 | 9/1951 | Spigener | 366/286 |
| 3,262,680 | 7/1966 | Balazer | 366/207 |
| 3,415,495 | 12/1968 | Grubelic | 366/605 |
| 4,042,221 | 8/1977 | Myers et al. | 366/250 |
| 4,729,878 | 3/1988 | Prommier | 422/135 |
| 4,775,242 | 10/1988 | Bohle | 366/209 |

FOREIGN PATENT DOCUMENTS

| | | | |
|---|---|---|---|
| 89594 | 9/1983 | European Pat. Off. | 366/241 |
| 119450 | 5/1900 | Fed. Rep. of Germany | 366/240 |
| 153247 | 7/1904 | Fed. Rep. of Germany | 366/240 |
| 1008176 | 5/1957 | Fed. Rep. of Germany | 366/241 |
| 1557042 | 1/1971 | Fed. Rep. of Germany . | |
| 2538768 | 10/1976 | Fed. Rep. of Germany . | |
| 3519647 | 12/1986 | Fed. Rep. of Germany . | |
| 3711987 | 10/1988 | Fed. Rep. of Germany . | |
| 1412820 | 8/1965 | France . | |
| 349477 | 11/1960 | Switzerland . | |
| 939821 | 10/1963 | United Kingdom | 366/193 |
| 1195905 | 6/1970 | United Kingdom . | |
| 1237290 | 6/1971 | United Kingdom | 366/206 |

*Primary Examiner*—Harvey C. Hornsby
*Assistant Examiner*—Mark Spisich
*Attorney, Agent, or Firm*—Peter K. Kontler

[57] ABSTRACT

Apparatus for mixing charges of flowable material has an open-top vessel movable up and down by fluid-operated motors along vertical guides, either with or relative to a cover which can seal the open top and is provided with an inlet for admission of fresh charges. The extent to which the cover is movable along the guides is limited by followers which are provided on the cover and extend into channels of the guides. The cover carries one or more rotary agitating devices with orbiting blades which mix the contents of the vessel while the open top is sealed by the cover. The central portion of the concavo-convex bottom wall of the vessel has an outlet normally sealed by a closure which is pivotable by a fluid-operated motor. The vessel is lowered away from the cover for the purposes of cleaning. The blades of at least one agitating device are preferably hollow and are designed in such a way that they agitate the contents of the vessel in response to rotation in one direction and that they push the contents of the vessel toward the outlet in the bottom wall in response to rotation in another direction counter to the one direction.

19 Claims, 4 Drawing Sheets

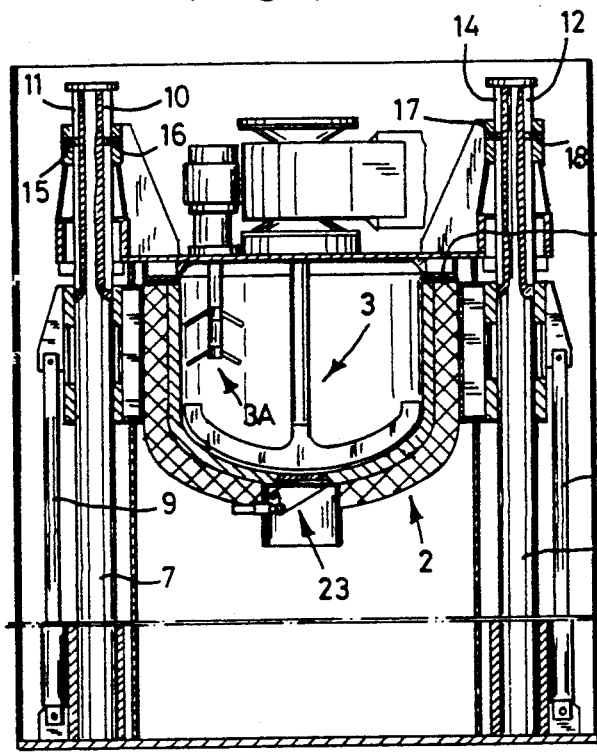
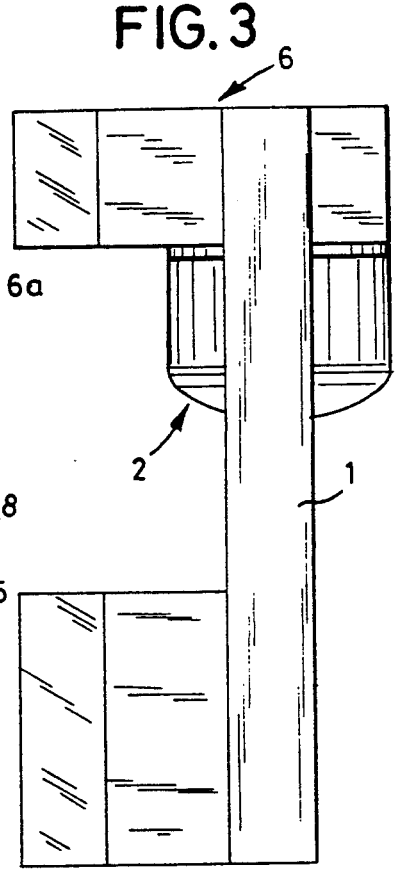
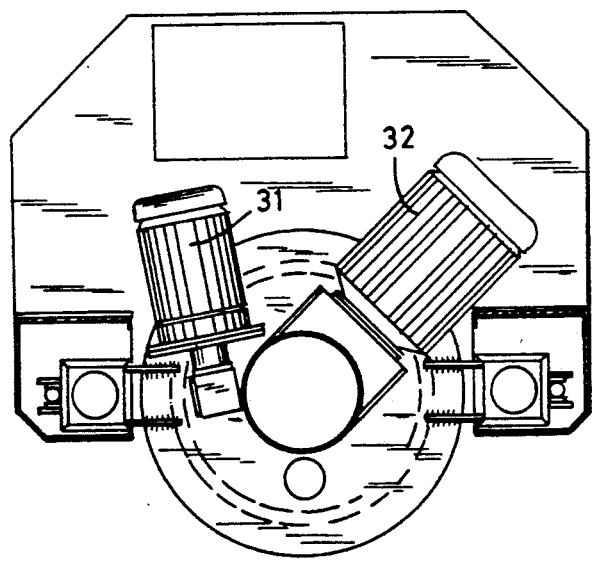

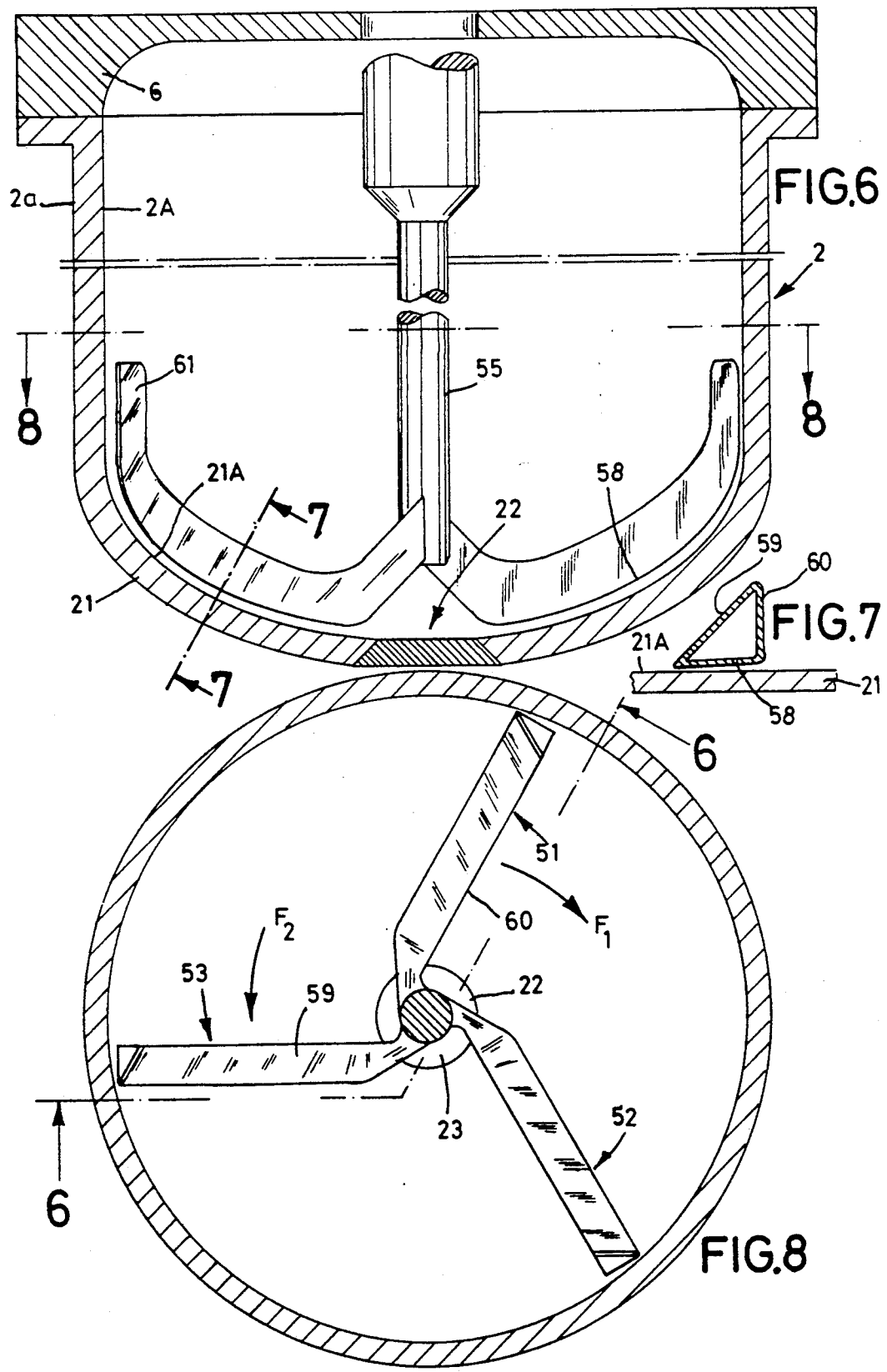

APPARATUS FOR MIXING CHARGES OF FLOWABLE MATERIAL

BACKGROUND OF THE INVENTION

The invention relates to mixing apparatus in general, and more particularly to improvements in apparatus wherein a vessel is employed to receive a charge of flowable solid and/or liquid material which is thereupon kneaded, stirred, mixed or similarly treated by one or more agitating devices, for example, in a manner as disclosed in commonly owned copending German patent application Serial No. P 39 21 143.6.

Swiss Pat. No. 349477 to Häfliger discloses a charge mixer wherein a fixed vessel has an open top for admission of a charge and carries the horizontal shaft of a rotary agitating device. The bottom wall of the vessel has a concavo-convex shape and includes a pivotable gate which can expose an outlet for treated charges. The gate is pivotable by a pneumatically operated cylinder and piston unit.

German Auslegeschrift No. 25 38 768 of Brandau discloses a mixing vessel with a concavo-convex bottom wall and a cylindrical sidewall having an outlet close to the bottom wall. The outlet can be sealed by a plug which is reciprocable by a fluid-operated cylinder and piston unit. The plug carries a specially mounted sealing element which prevents leakage of the contents of the vessel while the plug is maintained in the operative position, i.e., within the outlet.

Published German patent application No. 37 11 987 of Rosendahl et al. discloses a horizontal cylindrical mixing vessel cooperating with a horizontal rotary agitator and having two mirror symmetrical outlets in the lower part of its wall. Each outlet can be sealed by a discrete pivotable gate to discharge the contents of the vessel into one of two discrete ducts beneath the vessel. The upper portion of the vessel has an inlet for charges of material to be treated by the agitating device. The material is pulverulent or granular building material. The gates are pivotable by hydraulic motors, and the vessel further carries two motor-driven rotary stirring elements.

A gravity operated apparatus for intimately mixing the ingredients of chemical, pharmaceutical and/or other products is disclosed in commonly owned U.S. Pat. No. 4,775,242 to Bohle. The patented apparatus employs an upright vessel with an open top which can be sealed by a cover carrying one or more mixing elements extending into the vessel and serving to contribute to the mixing and/or agglomerating action upon the charge in the vessel while the vessel moves up and down and is oscillated or rotated about a horizontal axis. The vessel further serves to transfer freshly treated charges to the next processing station or stations.

Applicant is further aware of the disclosures in British Pat. No. 1,195,905 to Mukai, in U.S. Pat. No. 4,729,878 to Pommier et al., in published German patent application No. 35 19 647 to Röder et al., in French Pat. No. 1.142.820 to Rayneri, and in German Auslegeschrift No. 1 557 042 of Wisseroth et al.

OBJECTS OF THE INVENTION

An object of the invention is to provide a novel and improved mixing apparatus wherein the vessel for charges of material or materials to be treated can be properly sealed but is readily accessible for admission of fresh charges and/or for cleaning.

Another object of the invention is to provide a novel and improved actuating mechanism for the gate which controls the outlet of the vessel in the above outlined apparatus.

A further object of the invention is to provide novel and improved means for agitating the contents of the vessel in the above outlined mixing apparatus.

An additional object of the invention is to provide the agitating means with one or more novel and improved mixing, kneading or stirring elements.

Still another object of the invention is to provide a novel and improved combination of vessel and cover for use in the above outlined apparatus.

A further object of the invention is to provide a novel and improved combination of vessel and agitating means for use in the above outlined apparatus.

Another object of the invention is to provide a versatile apparatus which, though particularly suitable for use in the pharmaceutical plants, pharmacies and similar establishments, can be used with equal or similar advantage in many other industries for the treatment of charges or batches of flowable solid and/or liquid materials.

An additional object of the invention is to provide a novel and improved method of manipulating the vessel and its cover in the above outlined apparatus.

Another object of the invention is to provide the apparatus with novel and improved means for permitting rapid and convenient detachment and reattachment of the closure or gate for the charge-evacuating outlet or outlets of the vessel.

A further object of the invention is to provide a novel and improved positive or compulsory mixer of the type wherein one or more rotary stirring, mixing and/or kneading elements are driven by one or more motors to agitate the charge in a vessel which is or can be at a standstill during treatment of the charge.

SUMMARY OF THE INVENTION

The invention is embodied in an apparatus for mixing charges of flowable solid and/or liquid and/or viscous material. The improved apparatus comprises upright guides, a charge-receiving vessel having an open top and being movable up and down along the guides, means for moving the vessel along the guides, a cover which is provided with means for sealing the open top of the vessel and is movable along the guides to be lifted by the vessel and to descend by gravity on downward movement of the vessel, and means for agitating the charge in the vessel.

The guides can include a first and a second upright guide, and the means for moving the vessel along the guides can comprise at least one fluidoperated motor, e.g., one hydraulic or pneumatic cylinder and piston unit for each guide.

The vessel has at least one charge-evacuating outlet and a mobile closure for the outlet, and such apparatus preferably further comprises means for moving the closure relative to the outlet.

The apparatus preferably further comprises means for limiting the extent of movability of the cover relative to the guides, and such limiting means can comprise at least one upright track provided on at least one of the guides and a follower provided on the cover and engaging the track. The track can be provided with a channel of predetermined length, and the follower extends into the channel to confine the cover to movements through a distance corresponding to the length of the channel. The vessel can descend beneath and away from the arrested cover to afford access to the open top for the purpose of admitting a fresh charge, for the purpose of cleaning and/or for other purposes.

The means for moving the vessel and the guides can be confined in a hollow casing or housing of the improved apparatus. The cover can also include at least one hollow portion, e.g., to confine one or more motors for and/or certain other parts of the agitating means.

The vessel includes a plurality of walls including a bottom wall preferably having a concave upper side and provided with the aforementioned (preferably at least substantially centrally located) charge-evacuating outlet. The closure of the vessel for the outlet is movable between a predetermined first position in which the outlet is sealed, and at least one second position in which the outlet is exposed. Such vessel preferably further comprises means for separably coupling the closure to at least one of the walls. The coupling means can comprise a substantially horizontal pintle or another shaft on the at least one wall and a hook which is provided on the closure and engages the pintle. The hook is designed to be detachable from the pintle in the at least one second position of the closure relative to the bottom wall of the vessel.

The means for moving the closure can comprise a cylinder and piston unit having a first cylinder which is carried by the vessel, a piston which is reciprocable in and has a piston rod extending from the first cylinder, a second cylinder which engages the closure and reciprocably surrounds the first cylinder and is connected to the piston rod, and sealing means interposed between the first and second cylinders. The bottom wall of the vessel can include a downwardly extending duct which serves to receive a charge from the vessel by way of the outlet in response to movement of the closure from its predetermined position, and the second cylinder of the means for moving the closure can be reciprocably mounted in the duct.

The agitating means can comprise at least one preferably upright carrier which is rotatable at least in one direction and extends into the vessel (at least while the cover seals the open top of the vessel) and at least one mixing blade, arm of vane (hereinafter called blade) which is provided on the carrier. The upper side of the bottom wall is adjacent the blade and the latter has a bottom surface (e.g., a substantially flat or even bottom surface) which is adjacent the upper side of the bottom wall. Furthermore, the blade preferably comprises a front surface which extends upwardly from the bottom surface and slopes rearwardly counter to the at least one direction of rotation of the carrier. If the carrier is also rotatable in a second direction, the blade preferably further comprises a substantially vertical third surface which extends upwardly from the bottom surface opposite the front surface and faces in the second direction.

At least a portion of the at least one blade can extend substantially tangentially of the carrier. Furthermore, at least a portion of the at least one blade can be made of relatively thin metallic or other suitable sheet material.

The carrier can support two or more blades, particularly three blades.

If the agitating means comprises a single rotary carrier, such carrier is preferably a vertical rotor which is disposed substantially centrally of the vessel. The lower end of the carrier is or can be spaced apart from the upper side of the bottom wall of the vessel, and the mixing blade or blades can be connected to the lower end of such carrier. If the upper side of the bottom wall is concave, the outlet of the vessel is preferably located centrally of the bottom wall beneath the lower end of the carrier. The bottom surface of each blade can be disposed at an angle of 1°–10° to the upper side of the bottom wall of the vessel.

If one of the walls of the vessel is a sidewall having a cylindrical internal surface disposed above and merging into the maximum-diameter portion of concave upper side of the bottom wall, the bottom surface of each blade can have a convex portion which is adjacent the concave upper side of the bottom wall and a second portion (e.g., a substantially flat vertical portion) which is adjacent the cylindrical internal surface of the sidewall of the vessel.

The novel features which are considered as characteristic of the invention are set forth in particular in the appended claims. The improved mixing apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a partly front elevational and partly central vertical sectional view of an apparatus which embodies one form of the invention, the cover for the vessel being shown in the operative position in which it seals the open top of the vessel;

FIG. 2 is a top plan view of the apparatus which is shown in FIG. 1, with certain parts broken away;

FIG. 3 is a smaller-scale side elevational view of the apparatus;

FIG. 6 is a fragmentary vertical sectional view of the structure which is shown in FIG. 5, substantially as seen in the direction of arrows from the line 6—6 in FIG. 8;

FIG. 7 is an enlarged sectional view substantially as seen in the direction of arrows from the line 7—7 of FIG. 6; and FIG. 8 is a horizontal sectional view substantially as seen in the direction of arrows from the line 8—8 in FIG. 6.

DESCRIPTION OF PREFERRED EMBODIMENTS

Figure 4:
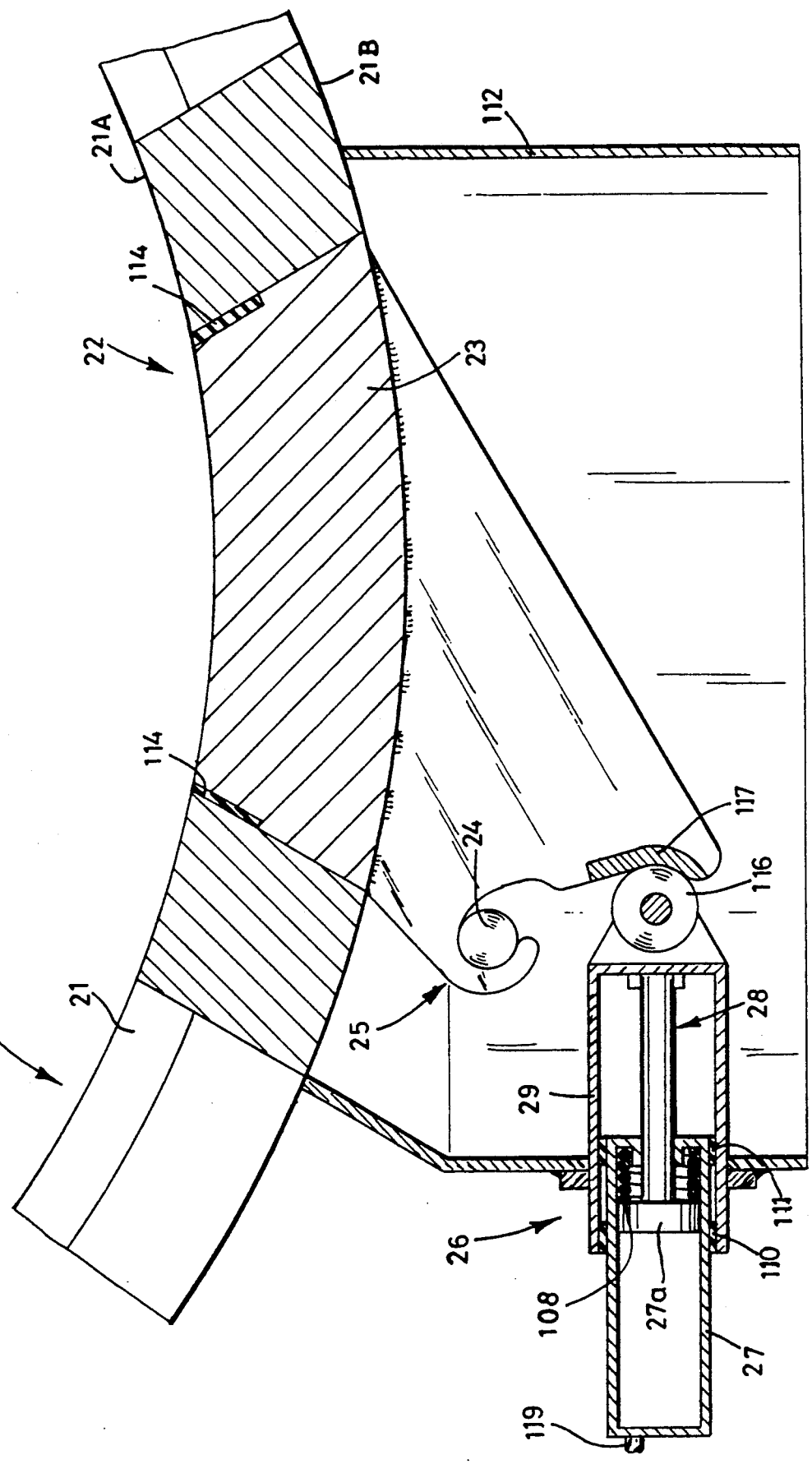
FIG. 4 is an enlarged view of a detail in FIG. 1, showing the means for moving the closure for the outlet in the bottom wall of the vessel.
Figure 5:
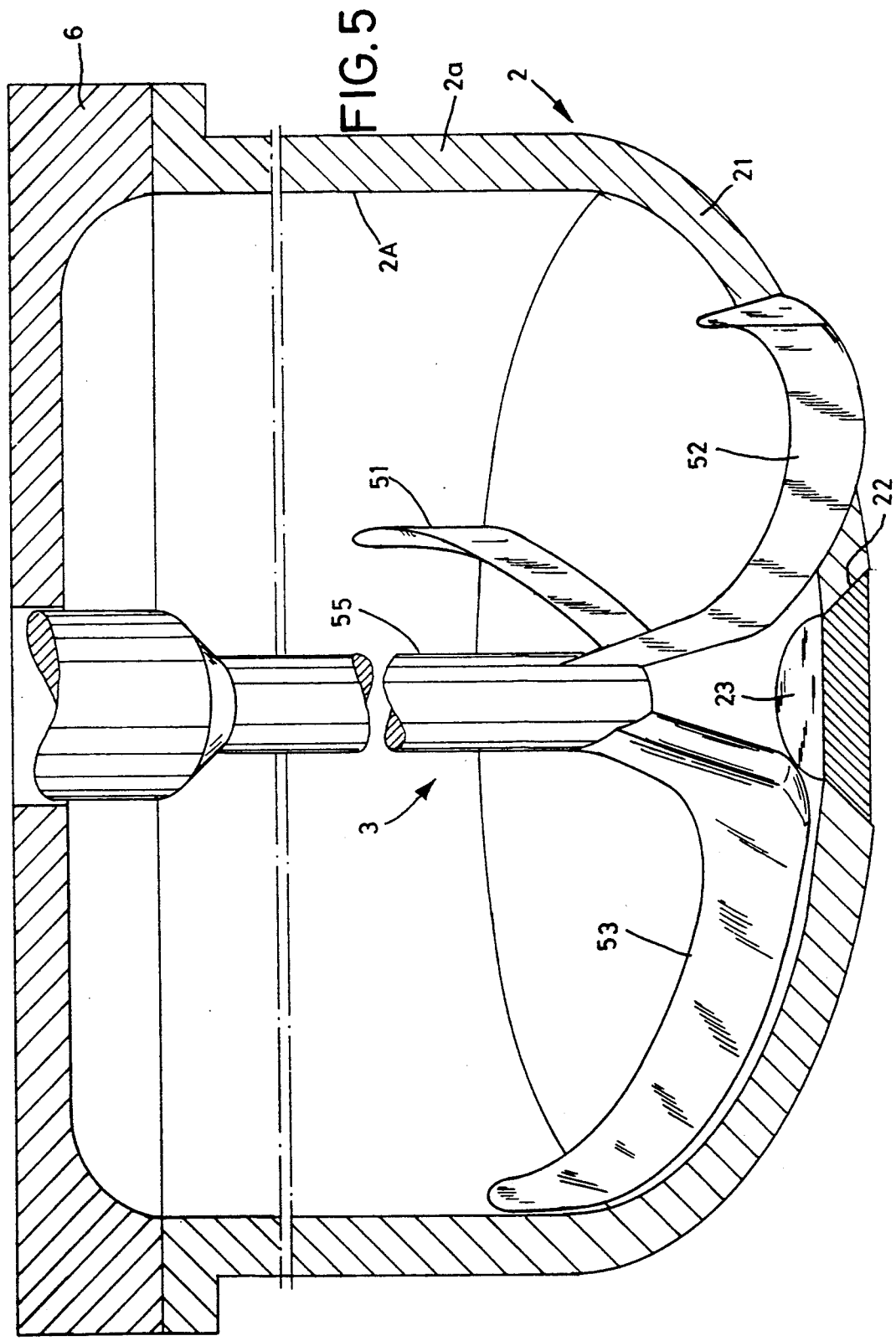
FIG. 5 is an enlarged fragmentary perspective view showing a portion of the vessel, a portion of the cover and a portion of the agitating means.

FIGS. 1 to 3 show a mixing apparatus having a hollow casing or housing 1 partially confining two upright guides 5, 7 for a vertically movable vessel 2 and its cover 6. The casing 1 further confines and supports means for moving the vessel 2 up and down along the guides 5 and 7; such moving means comprises two single acting or double acting fluid-operated (hydraulic or pneumatic) cylinder and piston units having upright piston rods 8, 9 connected to the vessel 2 in the regions of the guides 5 and 7, respectively.

The cover 6 supports an agitating device 3 with blades 51, 52, 53 (FIGS. 5 to 8) on an upright carrier 55 adapted to be driven by a variable-speed reversible electric motor 32. If desired or necessary, the cover 6 can support at least one additional or auxiliary agitating or stirring device 3A with an upright carrier extending into the interior of the vessel 2 (when the apparatus is ready for use) and adapted to be driven by a discrete variable-speed reversible or non-reversible electric motor 31.

In accordance with a feature of the invention, the cylinder and piston units which include the piston rods 8, 9 are designed to positively move the vessel 2 but not the cover 6. The latter can be lifted by the vessel 2 and can descend (e.g., by gravity alone or under the action of gravity and one or more springs) in response to downward movement of the vessel. Furthermore, the mixing apparatus comprises means for limiting the extent of movability of the cover 6 along the guides 5 and 7. Such limiting means comprises two upright tracks 10, 11 on the upper portion of the guide 7 and two upright tracks 12, 14 on the upper portion of the guide 5. These tracks have vertical channels for portions of pin- or stud-shaped followers 15, 16 and 17, 18 on the cover. The selected length of channels in the tracks 10, 11, 12 and 14 determines the extent of movability of the cover 6 along the guides 5 and 7. When the followers 15-18 reach the lower ends of channels in the respective tracks 11, 10, 14 and 12, the vessel 2 can descend relative to the arrested or intercepted cover 6 so that its open top is exposed for reception of a fresh charge of granular, pulverulent and/or liquid material which is to be stirred, mixed, kneaded, agglomerated and/or otherwise treated while a sealing device 6a at the underside of the cover 6 seals the open top of the vessel. At such time, the cover 6 can be held in its upper end position, in its lower end position or in any intermediate position, as long as its sealing device 6a properly engages and seals the vessel 2 at the open upper end of the latter. The stud- or pin-shaped followers 15-18 can be replaced with wheels or any other parts which can cooperate with complementary parts on the guide 5 and/or 7 to limit the extent of movability of the cover 6 with the vessel 2 (during upward movement of the vessel) or in response to movement of the vessel (while the piston rods 8, 9 cause or enable the vessel to descend along the guides). The guides 5, 7 are preferably located at diametrically opposite sides of the vessel 2 and cover 6.

The ability of the vessel 2 to descend relative to the cover 6 is desirable and advantageous on the additional ground that the interior of the vessel is then readily accessible for the purpose of inspection and/or cleaning. Moreover, the carriers and blades of the mixing or agitating devices 3 and 3A are also accessible as soon as the open top of the vessel 2 is moved downwardly and away from the sealing device 6a at the underside of the cover 6. The latter can be hollow, either entirely or in part, for example, to provide room for portions of the mixing or agitating device 3 and/or 3A.

The bottom wall 21 (FIG. 4) of the vessel 2 has a concave upper side 21A and a convex underside 21B. The central portion of this bottom wall is provided with an outlet 22 for evacuation of treated charges from the internal space of the vessel 2, and such outlet is normally closed and sealed by a mobile closure or gate 23 which can be pivoted between the predetermined operative or first position of FIG. 1 or 4 and at least one second position in which the outlet 22 is at least partially exposed and the treated charge of flowable material or materials can descend into an upright tubular duct or skirt 112 extending downwardly from the bottom wall 21 and surrounding the outlet 22 and closure 23. This closure can be moved (by a moving device 26) between its first and second positions in each and every position of the vessel 2, i.e., irrespective of the selected level of the vessel relative to the floor.

As can be seen in FIG. 4, the illustrated moving device 26 for the closure or gate 23 comprises a fluid-operated cylinder and piston unit having a first horizontal cylinder 27 which is carried by the vessel 2 and extends radially through an opening in the duct or skirt 112 of the bottom wall 21. The cylinder 27 receives a reciprocable piston 27a having a piston rod 28 which is connected with the closed end of a second horizontal cylinder 29 surrounding the cylinder 27 and being snugly received in the radial opening of the duct 112. Annular sealing elements 110, 112 are interposed between the cylinders 27, 29 to prevent the fluid escaping from the cylinder 27 via port 119 from entering the duct 112 in response to leftward movement of the piston 27a and cylinder 29 (as seen in FIG. 4). Such leftward stroke of the piston 27a results in pivoting of the closure 23 from the predetermined first or operative position of FIG. 4 because the closure 23 has an arcuate bearing portion 117 which engages a roller 116 at the exterior of the closed end of the cylinder 29.

The part 119 further serves to admit a pressurized hydraulic or pneumatic fluid in order to move the closure 23 to the position of FIG. 4 against the resistance of a helical spring 108 which tends to pivot or to permit pivoting of the closure to an open or inoperative position.

The means for pivotably coupling the closure 23 to the bottom wall 21 comprises a horizontal pintle or shaft 24 which is carried by the vessel 2 (e.g., by the duct 112) and a hook 25 which is carried by the closure 23 and engages the pintle 24. The closure 23 can pivot (under the action of gravity and under the weight of the charge in the vessel 2) to a (second) position in which the hook 25 can be detached from the pintle 24. This simplifies inspection and cleaning of the detached closure 23 as well as of the surface surrounding the outlet 22 in the bottom wall 21 of the vessel 2. The bearing portion 117 of the closure 23 is spaced apart from the coupling including the pintle 24 and the hook 25.

That surface of the closure 23 which is receivable in the outlet 22 carries one or more annular seals 114 which sealingly engage the surface bounding the outlet 22 when the device 26 is actuated to move the closure 23 to the predetermined or first position of FIG. 4. The seal or seals 114 can be replaced by or used jointly with one or more seals in the surface bounding the outlet 22 in the bottom wall 21 of the vessel 2.

The cover 6 can be provided with a sealable inlet which renders it possible to admit into the vessel 2 a fresh charge of one or more flowable materials while the sealing device 6a of the cover engages the open top of the vessel. Reference may be had to commonly, owned copending German patent application No. P39 21 143.6 of the assignee of the present application.

All such parts of the improved apparatus which come in contact with the charge and/or which must be cleaned at frequent intervals preferably consist of or are coated with panels, films and/or other layers of stainless steel or other corrosion-resistant material. A design which ensures convenient cleaning is particularly desirable if the improved apparatus is used in the pharmaceutical or chemical industries. The aforediscussed mounting of the closure 23 also contributes to convenient cleaning of the closure and of the bottom wall 21 of the vessel 2 in the region of the outlet 22.

Since the upper side 21A of the bottom wall 21 of the vessel 2 is preferably concave, a charge in the vessel exhibits the tendency to flow toward the preferably centrally located outlet 22 and to enter the duct 112 as soon as the closure 23 is pivoted away from the operative position of FIG. 4. As mentioned above, the closure 23 can be readily cleaned, the same as the surface surrounding the outlet 22 in the bottom wall 21, if the closure is completely detached from the vessel by disengaging the hook 25 from the pintle 24.

It is clear that the moving device 26 of FIG. 4 can be replaced with other suitable means for pivoting or otherwise moving the closure 23 to and from the operative position of FIG. 4. The illustrated moving device 26 is preferred at this time because the second cylinder 29 can perform several functions. Thus, the cylinder 29 prevents a hydraulic or gaseous fluid which leaves the cylinder 27 through the port 119 from entering the duct 112 and from contacting a charge which descends in the duct in response to exposure of the outlet 22. Secondly, the cylinder 29 can intercept that fluid (if any) which leaks from the cylinder 27 along the external surface of the piston rod 28.

FIGS. 5 to 8 show the details of a presently preferred mixing or agitating device 3 which can be used on the cover 6 to extend into the vessel 2 of the improved apparatus. The motor 32 of FIG. 2 can rotate the upright vertical carrier shaft 55 for three equidistant vanes, arms or blades 51, 52, 53 (hereinafter called blades). Each blade has a substantially triangular cross-sectional outline (FIG. 7) and is preferably made of relatively thin metallic or other suitable sheet material to contribute to a reduction of the weight of the agitating device 3. The lower end of the carrier 55 is located at least slightly above the outlet 22 and closure 23 in the central portion of the bottom wall 21 of the vessel, and the blades 51, 52 and 53 are affixed to such lower end so that they do not interfere with the flow of a freshly treated charge through the outlet 22 upon actuation of the moving device 26, i.e., upon pivoting of the closure 23 to one of its second positions.

FIG. 8 shows that the major portions of the blades 51 to 53 extend substantially tangentially (rather than radially) of the carrier 55. Thus, each of these blades has a relatively short inner portion which is affixed to the lower end of and extends substantially radially from the carrier 55, and a longer portion which is inclined relative to the radial portion and extends substantially tangentially of the surface bounding the outlet 22 in the bottom wall 21 of the vessel 2. Such design of the blades 51 to 53 is desirable and advantageous because the illustrated blades not only promote the agitating action but can also assist in expulsion of a treated charge from the vessel 2 by way of the outlet 22.

An advantage of hollow (and hence lightweight) blades 51 to 53 is that the carrier 55 can be driven by a smaller motor 32 and that the energy requirements of the means for agitating the charge in the vessel 2 are reduced accordingly. Each blade has a generally flat bottom surface or first surface 58 which confronts the upper side 21A of the bottom wall 21 and a portion of the cylindrical internal surface 2A of the upright tubular sidewall 2a of the vessel; a front surface 59 which extends upwardly from the respective bottom surface 58 and slopes rearwardly as seen in the direction of arrow $F_2$ (it being assumed that the motor 32 is set to rotate the carrier 55 in a counterclockwise direction as seen in FIG. 8); and a substantially vertical third surface 60 facing in the direction of arrow $F_1$ which indicates a second possible direction of rotation of the carrier 55.

When the motor 32 is started to rotate the carrier 55 in a counterclockwise direction (arrow $F_2$ in FIG. 8), the leading second or front surfaces 59 of the blades 51 to 53 lift adjacent portions of the charge in the vessel 2 above and away from the upper side 21A of the bottom wall 21 to thus promote the mixing, kneading, stirring and/or other agitating action upon the confined flowable material. The front surface 59 of the orbiting blade 51 can lift the adjacent portion of the charge above the next-following blade 52, the front surface 59 of the blade 52 can lift a portion of the charge above the next-following blade 53, and the front surface 59 of the blade 53 can lift a portion of the charge above the blade 51.

Additional mixing, stirring, kneading or other agitating action is performed by the upwardly extend vertical outermost portions 61 of the blades 51 to 53; such vertical portions are adjacent the internal surface 2A of the sidewall 2a and can cause adjacent batches of the confined charge to move radially inwardly and to descend onto the radially inner portions of the orbiting blades.

FIG. 6 shows that the bottom surfaces 58 of the blades 51 to 53 need not be exactly parallel to the upper side 21A of the bottom wall 21; in fact, such bottom surfaces can make with the upper side 21A angles of 1 to 10 degrees in order to further enhance the agitating action.

When the motor 32 is started to rotate the carrier 55 in the direction of arrow $F_1$, the third surfaces 60 are operative to sweep the freshly treated charge toward the outlet 22 for evacuation from the vessel 2 as soon as the closure 23 is pivoted away from its operative position.

An advantage of the combination of improved agitating device 3 with the vessel 2 (i.e., with a vessel having a bottom wall 21 with a concave upper side 21A) is that the blades 51-53 of the agitating device 3 can ensure complete or practically complete evacuation of a freshly treated charge through the exposed outlet 22 by the simple expedient of causing the motor 32 to rotate the carrier 55 in the direction of arrow $F_1$. The improved apparatus is superior to conventional apparatus (e.g., apparatus of the type shown in the German Auslegeschrift No. 25 38 768 of Brandau) wherein the outlet is provided in the sidewall rather than at the center of the bottom wall which has a concave upper side. Another advantage of an apparatus which embodies the agitating device 3 of FIGS. 5 to 8 is that the weight of such device is or can be a fraction of the weight of a conventional agitating device with solid blades. The blades 51-53 of the improved agitating device 3 can perform a highly satisfactory kneading, stirring, mixing or other agitating action while they rotate in the direction of arrow $F_2$, and the same blades can ensure complete or practically complete expulsion of a freshly treated charge by the simple expedient of reversing the direction rotation of the carrier 55 (from $F_2$ to $F_1$).

The radially outermost portions 61 of the blades 51 to 53 also contribute to more satisfactory agitating action in that they compel the adjacent batches or layers of a confined charge to move along and away from the internal surface 2A of the sidewall 2a and to thereupon descend onto the bottom wall 21 to be entrained and mixed by the radially inner portions of the blades.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for mixing charges of flowable material, comprising upright guides; a charge-receiving vessel having an open top and being movable up and down along said guides; means for moving said vessel along said guides; a cover having means for sealing the open top of said vessel, said cover being movable along said guides to be lifted by said vessel and to descend by gravity on downward movement of said vessel; and means for agitating the charge in said vessel, comprising an upright rotary carrier disposed substantially centrally of and extending into said vessel, at least while said sealing means seals the open top of said vessel, said vessel including a bottom wall and said carrier having a lower end disposed above and spaced apart from said bottom wall, said agitating means further comprising at least one mixing blade connected to said lower end and spaced apart from said bottom wall, said bottom wall having a concave upper side, a substantially centrally located charge-evacuating outlet, a closure for said outlet, and means for moving said closure to and from a position in which said outlet is sealed.

2. The apparatus of claim 1, wherein said guides include a first and a second guide and said moving means comprises at least one fluidoperated motor.

3. The apparatus of claim 2, wherein said moving means comprises a plurality of cylinder and piston units.

4. The apparatus of claim 1, further comprising means for limiting the extent of movability of said cover relative to said guides.

5. The apparatus of claim 4, wherein said limiting means comprises at least one upright track provided on at least one of said guides and a follower provided on said cover and engaging said track.

6. The apparatus of claim 5, wherein said track has a channel of predetermined length and said follower extends into said channel.

7. The apparatus of claim 1, further comprising a hollow casing for said moving means and for said guides.

8. The apparatus of claim 1, wherein said cover includes at least one hollow portion.

9. The apparatus of claim 1, wherein said vessel comprises a plurality of walls one of which constitutes said bottom wall, said agitating means further comprising means for separably coupling said closure to at least one of said walls.

10. The apparatus of claim 9, wherein said coupling means comprises a pintle on said at least one wall and a hook provided on said closure and engaging said pintle, said hook being detachable from said pintle in a position of said closure in which said outlet is exposed.

11. The apparatus of claim 1, wherein said vessel comprises a plurality of walls one of which constitutes said bottom wall, said closure being mounted on one of said walls and said means for moving said closure including a cylinder and piston unit, said unit comprising a first cylinder carried by said vessel, a piston reciprocable in and having a piston rod extending from said first cylinder, a second cylinder engaging said closure and reciprocably surrounding said first cylinder and connected to said piston, and at least one sealing element interposed between said cylinders.

12. The apparatus of claim 11, wherein said bottom wall includes a downwardly extending duct arranged to receive a charge from said vessel by way of said outlet in response to movement of said closure from said position, said second cylinder being reciprocably mounted in said duct.

13. The apparatus of claim 1, wherein said at least one carrier rotatable in at least one direction and is into said vessel, at least while said sealing means said at least one mixing blade has a front surface extending upwardly from said bottom surface and sloping rearwardly counter to said direction.

14. The apparatus of claim 13, wherein said carrier is further rotatable in a second direction counter to said at least one direction, said blade further having a third surface extending upwardly from said bottom surface and facing in said second direction.

15. The apparatus of claim 13,, wherein at least a portion of said at least one blade extends substantially tangentially of said carrier.

16. The apparatus of claim 13, wherein at least a portion of said at least one blade consists of thin sheet material.

17. The apparatus of claim 13, wherein said agitating means comprises three blades.

18. The apparatus of claim 1, wherein at least one blade has a bottom surface adjacent and disposed at an angle of 1°–10° to said upper side.

19. The apparatus of claim 1, wherein said vessel further includes a sidewall disposed above said bottom wall and having a substantially cylindrical internal surface, said at least one blade having a bottom surface including a convex portion adjacent said upper side and a second portion adjacent said internal surface.

* * * * *